United States Patent Office 3,484,397
Patented Dec. 16, 1969

3,484,397
METHOD OF IMPROVING HEAT STABILITY OF VINYL CHLORIDE POLYMERS
Paul J. Szalay and Carl A. Johnson, Toledo, Ohio, assignors to Owens-Illinois, Inc., a corporation of Ohio
No Drawing. Filed Oct. 22, 1965, Ser. No. 502,366
Int. Cl. C08f 45/58, 3/30
U.S. Cl. 260—17.5     8 Claims

ABSTRACT OF THE DISCLOSURE

By admixing a ligno component selected from the group consisting of kraft lignin and thioglycolic acid lignin with a polymer of vinyl chloride, improved heat stabilization of these heat sensitive polymers is achieved.

---

The present invention relates to new polymer compositions, methods of preparing same and articles produced therefrom. More particularly, the present invention relates to synthetic organic poymers that have been modified so as to enhance their properties and characteristics and particularly the improved stabilization of heat sensitive polymers with complex organic substances such as Kraft lignin and thioglycolic acid lignin.

In the past, various stabilizing components and other modifying ingredients have been compounded with synthetic organic polymers and resins of all types in order to improve their properties and characteristics. Often the presence of stabilizers is required in order to prevent change of properties during the processing and working of the resin and to protect the finished product or article of manufacture when it has been further exposed to the elements, particularly heat and light. Depending upon the specific structure, in many instances the polymer is incapable of being used to proper advantage without the presence of considerable amounts of stabilizers. Exemplary of the polymers requiring the presence of heat stabilizers are polyvinyl chloride, polyethylene, polypropylene, other vinyl chloride polymers such as vinyl chloride-vinyl acetate copolymers. Many different types of stabilizers have been used including organo tins, carboxylates, various epoxies, phosphites, nitrogen compounds, lead compounds and the like.

The mechanism whereby these compounds function to stabilize synthetic organic polymers is not well understood and applicant does not intend to present an exhaustive explanation of the subject. Some stabilizers perform very satisfactorily whereas others do not have all around usefulness and are highly specific in their behavior.

Accordingly, it is an object of the present invention to provide modified synthetic polymers and methods of making same.

It is a further object of the present invention to improve the properties and characteristics of heat sensitive synthetic organic polymers which avoid the shortcomings and disadvantages associated with prior known methods and compositions.

It is a further object of the present invention to provide a method for imparting heat stability to heat sensitive synthetic organic polymers.

It is a further object of the present invention to provide a method for modifying the structure of heat sensitive polymers so as to impart heat stability thereto.

It is a further object of the present invention to provide a method for modifying the properties and characteristics of synthetic organic polymer compositions in order to enhance their usefulness for a wider variety of purposes.

It is a further object of the present invention to stabilize heat sensitive thermoplastic polymer plastisol and organosol compositions in order to improve their properties and characteristics.

It is a further object of the present invention to provide a method for modifying the properties and characteristics of vinyl chloride polymer compositions.

It is a further object of the present invention to provide improved vinyl chloride polymer compositions.

In attaining the above objects, one feature of the present invention resides in modifying heat sensitive synthetic organic polymers with a member selected from the group consisting of Kraft lignin and thioglycolic acid lignin to impart improved properties and characteristics thereto.

Another feature of the present invention resides in imparting improved properties to vinyl chloride polymers by intimately contacting therewith, under selected conditions, Kraft lignin or a sulfonated lignin such as thioglycolic acid lignin.

Another feature of the present invention resides in vinyl chloride polymer compositions having been modified by reaction with Kraft lignin or thioglycolic acid lignin in order to improve the properties and characteristics of said polymer compositions making them suitable for a wider variety of applications.

The above, as well as other objects, features and advantages of the present invention, will become apparent from the following detailed description thereof.

According to the present invention, there is provided a method for improving the properties of synthetic organic polymers, particularly with respect to heat stability, rheological characteristics and physical-chemical properties in general by modification with a highly complex organic molecule derived from lignin, such as Kraft lignin obtained from the Kraft process in paper making. A sulfonated lignin such as TGA lignin (thioglycolic acid lignin) or ligno-sulfonic acid can also be used. The lignin component is used in a sufficient amount so that the resulting modified polymer compositions have enhanced properties making them suitable for a wider variety of end uses. The compositions of the present invention containing the modified organic polymer can be used for the preparation of any articles of manufacture or products for which the resins are normally used as well as other applications which are a direct result of the improved properties to be described hereinafter. Molding and extrusion of various shaped articles e.g., containers are illustrative of the uses for the present compositions.

The present invention is carried out by mixing the lignin component with the selected polymer in suitable amounts and at elevated temperature and thoroughly dispersing the lignin component into the polymer to obtain a modified composition having the desired properties and characteristics. Generally, the lignin component can be incorporated into heat sensitive polymers such as polyvinyl chloride, vinyl chloride-vinyl acetate copolymers, polypropylene and its copolymers, polyethylene and its copolymers. Preferably, a catalyst for the reaction is mixed with the reactants.

It has been observed that the synthetic organic resin compositions of the present invention containing the lignin component have great advantages over the usual organic polymer compositions without stabilizers. For example, a conventionally stabilized polyvinyl chloride resin will degrade after a 2 to 20 minutes at 350–400° F. Therefore, the polyvinyl chloride compounds represent serious difficulties in the extrusion field due to their poor heat stability properties. However, after having the lignin component incorporated therein, polyvinyl chloride compositions made according to the present invention have greatly improved heat stability and therefore, may be processed more easily and more readily than was heretofore possible.

The synthetic organic polymers, particularly the thermoplastic polymers that are particularly heat sensitive such as polyvinyl chloride or copolymers of vinyl chloride can be compounded with the Kraft lignin or the thioglycolic lignin to give very suitable polymer compositions that can be fabricated with conventional machines into the various and assorted shapes. The polymer compositions obtained by simple mixing techniques may be extruded, blow-molded, injection molded and formed according to any other suitable techniques as will be apparent. The consistency of the polymeric materials may vary from very soft to rigid conditions depending upon the formulations.

Lignin and lignin-sulfonic acid have been discussed in the literature and no further information regarding structure is necessary. One of the possible reactions between lignin and thioglycolic acid to form thioglycolic-lignin is represented as follows:

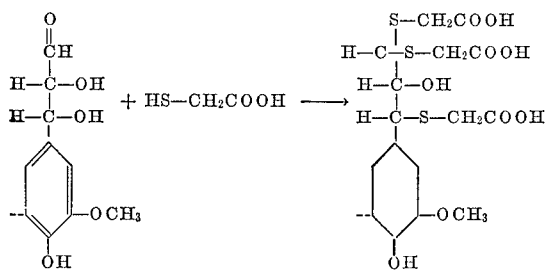

Although it is not intended to be limiting of the invention in any way, it is believed that the synthetic organic polymer compositions obtained as a result of the present invention can be explained by a grafting technique whereby the lignin molecule is grafted on the polymer substrate or backbone. In addition, inasmuch as the lignin component contains a plurality of hydroxyl groups, it is also possible that the formation of hydrogen bonds takes place between selected atoms of the thermoplastic polymer and the hydroxyl groups of the lignin. For example, hydrogen bonding could readily take place between the chloride atom of polyvinyl chloride and the hydroxyl groups of Kraft lignin. The following equation is presented as a possible explanation of the various reactions that may occur in the course of carrying out the present invention. It is, of course, to be noted that the equations are not intended to limit the present invention but are offered as a possible explanation of the theoretical mechanism that occurs.

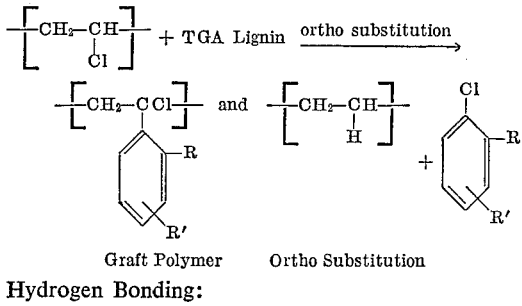

Graft Polymer    Ortho Substitution

Hydrogen Bonding:

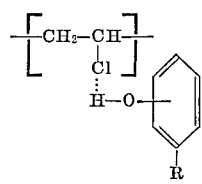

The infrared spectrum of a polyvinyl chloride-lignin graft polymer exhibits strong carbonyl absorption in the region 1700 cm.$^{-1}$. Intramolecular hydrogen bonds from the lignin portion of the polymer give rise to broad absorption bands in the 3450–3200 cm.$^{-1}$ range. The absorption peaks in the spectrum confirm graft formations. Moreover, changes in the viscosity of the polymer compositions also indicate graft formation. For example, the inherent viscosity of a 1% solution of polyvinyl chloride homopolymer is 0.59. The inherent viscosity of a 1% solution of polyvinyl chloride-lignin polymer is 0.61.

A suitable source for the lignin component is Kraft lignin which is readily available and economical for use in large quantities for commercial operations. Kraft lignin can be used per se or can be sulfonated by suitable means to yield a ligno-sulfonic acid, or TGA lignin.

Compositions representative of the present invention may be prepared in considerable variation as indicated by the following formulation:

| | Parts by weight |
|---|---|
| Resin | 10–100 |
| Lignin derivative | 1–500 |
| Plasticizer | 0–200 |
| Stabilizers | 0–20 |
| Pigments | 0–100 |

It is to be understood that numerous other compounding ingredients, which could not adversely affect the compositions, may be incorporated therein. Such variations will be apparent to those skilled in the art.

A wide variety of plasticizers may be used for purposes of the present invention. Illustrative are dioctyl phthalate, diisooctyl phthalate, sebacates, azelates and the like. Other plasticizers such as epoxy plasticizers may also be employed; e.g. Paraplex G–62. It will be readily apparent from the foregoing that any plasticizer suitable for vinyl chloride polymers and copolymers can be utilized provided it does not interfere with the lignin component or with the graft formation.

Various catalysts and stabilizers may be used according to the invention. A preferred group are organo-tin compounds such as dioctyl-tin-dithioglycolate. This substance acts to catalyze the grafting of the lignin derivative onto the vinyl chloride polymer backbone. In addition, it acts as a stabilizer to prevent a complete degradation of the polymer. The chemical structure of the organo-tin compounds is represented by the formula:

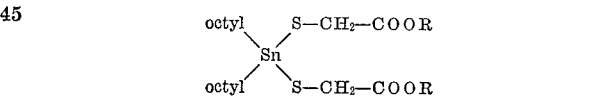

wherein R is H or $C_1$ to $C_{10}$ alkyl. Other suitable catalysts are free radical catalysts such as azodiisobutyronitrile.

The following examples serve to illustrate the present invention without limiting it in any way.

EXAMPLE I

The following composition was prepared in order to test the compositions of the present invention and it was observed that the polyvinyl chloride modified resin had greatly improved heat stability.

| Component: | Parts by wt. |
|---|---|
| Polyvinyl chloride resin (Pliovic S–50) | 100 |
| Thioglycolic acid lignin | 100 |
| Dioctyl phthalate plasticizer | 50 |
| Dioctyl-tin-dithioglycolate (T–831 — Metal & Thermit Corp.) | 2 |

The resin and lignin were weighed and placed in a Hobart mixer and mixed for one minute at low speed. Then the plasticizer and tin compound were added and the composition was mixed at speed No. 2 for 30 minutes at 200°–300° F. The free flowing powder was obtained. The composition was found to exhibit substantially improved heat stability. Samples were pressed at 380° F. for 1 hour. This improvement is unexpected in view of the fact that generally polyvinyl chloride will degrade after 3 to 20 minutes at 350° to 400° F.

EXAMPLE II

The following composition was prepared in order to test the compositions of the present invention and it was observed that the polyvinyl chloride modified resin had greatly improved heat stability.

| Component: | Parts by wt. |
|---|---|
| Polyvinyl chloride resin (Pliovic S-50) | 100 |
| Kraft lignin | 150 |
| Dioctyl phthalate | 60 |
| Dioctyl-tin-dithioglycolate (T-831) | 2 |

The components were mixed as described in Example I. Outstanding heat stability was observed, the composition being tested at 380° F. for 1 hour.

EXAMPLE III

The following composition was prepared in order to test the compositions of the present invention and it was observed that the polyvinyl chloride modified resin had greatly improved heat stability.

| Component: | Parts by wt. |
|---|---|
| Polyvinyl chloride resin | grams 50 |
| Kraft lignin | do 10 |
| Azodiisobutyronitrile | do 1 |
| Methylethyl ketone | ml 400 |

The mixture was kept at 80° C. and stirred vigorously for 26 hours under a nitrogen atmosphere. The polymer was then precipitated with absolute methanol and washed with methanol. Excellent properties of heat stability were observed.

EXAMPLE IV

The following composition was prepared in order to test the compositions of the present invention and it was observed that the polyvinyl chloride modified resin had greatly improved heat stability.

| Component: | Parts by wt. |
|---|---|
| Polyvinyl chloride resin | 100 |
| Thioglycolic lignin | 100 |
| Dioctylphthalate | 40 |

The mixture was prepared as in Example I and found to have good properties of heat stability.

Although the foregoing specification and examples illustrate the present invention with particular reference to polyvinyl chloride, it is to be understood that the present invention is applicable to many organic synthetic polymers that are sensitive to heat. Generally, the principles of the present invention are applicable to plastisols, organosols as well as thermosetting resin compositions which are sensitive to heat and may undergo degradation at high temperature.

The composition prepared according to the present invention may be further modified by incorporation herein of various other ingredients, modifying agents, stabilizers, plasticizers, pigments, special additives to produce specialized effects and the like, provided that the secondary ingredients do not deleteriously affect the resulting compositions and do not in any way inhibit the action of the lignin components described above. Likewise formulations may be varied from very soft to rigid consistency and from translucent-clear to opaque.

What is claimed is:

1. A method of imparting increased heat stability to a heat sensitive thermoplastic vinyl chloride polymer composition which consists essentially of admixing with said heat sensitive thermoplastic vinyl chloride polymer composition a heat stabilizing ligno component consisting essentially of a member selected from the group consisting of kraft lignin and thioglycolic acid lignin, the amount of said heat stabilizing ligno component ranging from 1 to 500 parts by weight of said composition, and said amount of said thermoplastic vinyl chloride polymer ranging from 10 to 100 parts by weight of said composition.

2. A method according to claim 1 wherein said composition after admixing comprises:

| | Parts by wt. |
|---|---|
| Vinyl chloride polymer | 10-100 |
| Ligno component | 1-500 |
| Plasticizer | 0-200 |
| Co-stabilizers | 0-20 |
| Pigments | 0-100 |

3. A method in accordance with claim 2 wherein said co-stabilizers are comprised of a dioctyl tin compound.

4. A method in accordance with claim 3 wherein said dioctyl tin compound is dioctyl-tin-dithioglycolate.

5. A method in accordance with claim 1 wherein said thermoplastic vinyl chloride polymer is polyvinyl chloride.

6. A method in accordance with claim 1 which also includes the step of milling the ingredients of said composition together to obtain a uniform dispersion of said ligno component in said thermoplastic vinyl chloride polymer.

7. A method in accordance with claim 1 wherein said vinyl chloride polymer is in solid particulate form.

8. A product by the process of claim 1.

References Cited

UNITED STATES PATENTS

| 3,083,118 | 3/1963 | Bridgeford | 117—47 |
| 2,791,600 | 7/1957 | Schwaegerle | 260—29.6 |
| 3,330,788 | 7/1967 | Montgomery | 260—17.5 |

OTHER REFERENCES

Modern Plastics Encyclopedia for 1966, September 1965, McGraw-Hill, pp. 438 and 439.

WILLIAM H. SHORT, Primary Examiner

E. NIELSEN, Assistant Examiner

U.S. Cl. X.R.

260—45.95, 92.8